United States Patent
Trofimov et al.

(10) Patent No.: US 9,821,788 B2
(45) Date of Patent: Nov. 21, 2017

(54) METHOD FOR REDUCING DRAG TORQUE FLUCTUATIONS UPON ELECTRIC DRIVE-OFF

(71) Applicant: Robert Bosch GmbH, Stuttgart (DE)

(72) Inventors: Alexander Trofimov, Ludwigsburg (DE); Michael Barth, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/715,256

(22) Filed: May 18, 2015

(65) Prior Publication Data
US 2015/0329101 A1     Nov. 19, 2015

(30) Foreign Application Priority Data
May 19, 2014   (DE) .................. 10 2014 209 395

(51) Int. Cl.
| | |
|---|---|
| *B60W 20/00* | (2016.01) |
| *B60W 30/18* | (2012.01) |
| *B60W 10/08* | (2006.01) |
| *B60W 10/18* | (2012.01) |
| *B60K 6/485* | (2007.10) |
| *B60W 20/10* | (2016.01) |

(52) U.S. Cl.
CPC .............. *B60W 20/10* (2013.01); *B60K 6/485* (2013.01); *B60W 10/08* (2013.01); *B60W 10/18* (2013.01); *B60W 20/00* (2013.01); *B60W 30/18* (2013.01); *B60W 30/18027* (2013.01); *B60W 2510/0685* (2013.01); *B60W 2510/18* (2013.01); *B60W 2520/00* (2013.01); *B60W 2520/10* (2013.01); *B60W 2710/083* (2013.01); *B60W 2710/18* (2013.01); *Y10S 903/93* (2013.01)

(58) Field of Classification Search
CPC ...... B60W 20/10; B60W 30/18; B60W 10/08; B60W 10/18; B60W 30/18027; B60W 2710/083; B60W 2520/00; B60W 2710/18; B60K 6/485; Y10S 903/93
See application file for complete search history.

(56) References Cited

U.S. PATENT DOCUMENTS

| | | | |
|---|---|---|---|
| 2004/0129470 A1* | 7/2004 | Huelser .................. | B60K 6/485 180/170 |
| 2005/0216162 A1* | 9/2005 | Suzuki ............... | B60K 31/0083 701/70 |

(Continued)

FOREIGN PATENT DOCUMENTS

| | | |
|---|---|---|
| DE | 19532128 A1 | 3/1997 |
| DE | 102007061940 A1 | 11/2008 |

(Continued)

OTHER PUBLICATIONS

Machine translation WO 2013076068 A1.*

*Primary Examiner* — Frederick Brushaber
(74) *Attorney, Agent, or Firm* — Norton Rose Fulbright US LLP; Gerard Messina

(57) ABSTRACT

A method is described for operating a motor vehicle, in which control is applied, in the context of a drive-off operation, to an electrical machine operable in motor mode in order to deliver a torque driving the vehicle, control simultaneously being applied to a braking system of the motor vehicle in such a way that it applies a braking torque.

6 Claims, 3 Drawing Sheets

(56) References Cited

U.S. PATENT DOCUMENTS

| | | | | |
|---|---|---|---|---|
| 2006/0108956 A1* | 5/2006 | Clark | ............... | B60L 3/108 |
| | | | | 318/139 |
| 2008/0154472 A1* | 6/2008 | Okuda | ............... | B60K 6/44 |
| | | | | 701/93 |
| 2010/0151988 A1* | 6/2010 | Tabata | ............... | B60K 6/442 |
| | | | | 477/3 |
| 2014/0274560 A1* | 9/2014 | Tassinger | ............... | F16H 61/20 |
| | | | | 477/93 |
| 2014/0277984 A1* | 9/2014 | Pietron | ............... | B60T 8/1761 |
| | | | | 701/78 |

FOREIGN PATENT DOCUMENTS

| | | | | |
|---|---|---|---|---|
| DE | 102008037809 A1 | 2/2010 | | |
| DE | WO 2013076068 A1 * | 5/2013 | ............ | F16H 61/20 |

\* cited by examiner

METHOD FOR REDUCING DRAG TORQUE FLUCTUATIONS UPON ELECTRIC DRIVE-OFF

CROSS REFERENCE TO RELATED APPLICATION

The present application claims priority to Application No. DE 10 2014 209 395.3, filed in the Federal Republic of Germany on May 19, 2014, which is incorporated herein in its entirety by reference thereto.

FIELD OF INVENTION

The present invention relates to a method for operating a motor vehicle, to a calculation method for carrying it out, and to a computer program for operating a motor vehicle.

BACKGROUND INFORMATION

German patent application DE 10 2014 202 058, not previously published, discusses a method for operating a motor vehicle in which, in the context of a drive-off operation using an electric motor coupled to an internal combustion engine of the motor vehicle, control is applied to the electric motor in order to deliver a torque in such a way that the torque delivered by the electric motor contains a crankshaft angle-dependent component that counteracts crankshaft angle-dependent fluctuations of a drag torque of the internal combustion engine.

SUMMARY OF THE INVENTION

The present invention is to a method for operating a motor vehicle. In further aspects, a calculation unit and a computer program having the features described herein are proposed.

Advantageous embodiments are the subject matter described herein and of the description below.

When control is applied, in the context of a drive-off operation, to an electrical machine operable in motor mode in order to deliver a torque driving the motor vehicle, control being simultaneously applied to a braking system of the motor vehicle in such a way that it applies a braking torque (e.g. to the wheels of the vehicle so that their rotational motion experiences a braking effect), the drive-off operation can be controlled particularly easily.

It has been recognized that an elevated torque of the electrical machine operable in motor mode is necessary when drive-off occurs on roadway irregularities (e.g. when a roadway edge is located directly in front of the wheels), or when gas-spring forces resulting from compression and decompression of the air in the cylinders must be overcome in the context of a rolling start of an internal combustion engine. If the obstacle, i.e. for example the roadway edge or the gas spring, is overcome abruptly, it is not readily and easily possible for the electrical machine operable in motor mode to reduce the torque quickly, which is perceptible in such situations as a jolt and is thus uncomfortable.

If the driving torque that is provided by the electrical machine operable in motor mode is deliberately superelevated, this can then be compensated for again by the braking torque of the braking system, for example of an ESP system. It has been recognized that a buildup of the braking torque of the braking system is appreciably faster than a reduction of the driving torque of the electrical machine operable in motor mode. Comfortable drive-off can therefore be achieved in particularly simple fashion.

Conversely, if a requested total torque increases, this modified request can be complied with by decreasing the braking torque. This is appreciably faster than an elevation of the driving torque of the electrical machine operable in motor mode.

In a refinement, it is possible to regulate this drive-off operation on the basis of an ascertained actual speed value of the motor vehicle. If a rapid rise in the actual speed value is detected, or if it is detected that the actual speed value is quickly approaching a target speed value, or if it is detected that the actual speed value exceeds the target speed value, an uncomfortable jolt can be prevented in particularly simple fashion by a corresponding application of control to the braking system.

It is thus possible, in the case of an unexpected higher torque demand (e.g. if the front wheels of the motor vehicle are resting against a roadway edge), to carry out the drive-off operation successfully and comfortably by way of the elevated driving torque. The driving torque that is set too high is modulated at the wheels of the motor vehicle by the braking torque of the braking system.

Implementation of the method in the form of software is also advantageous because this entails particularly low costs, especially if an executing calculation unit is also used for further tasks and is therefore present in any case. Suitable data media for furnishing the computer program are, in particular, diskettes, hard drives, flash memories, EEPROMs, CD-ROMs, DVDs, and many others. Downloading of a program via computer networks (Internet, intranet, etc.) is also possible.

Further advantages and embodiments of the invention are evident from the description and from the attached drawings.

Various aspects of an exemplifying embodiment of the invention are depicted schematically in the drawings and will be described in detail below with reference to the drawings.

DETAILED DESCRIPTION

Figure 1:
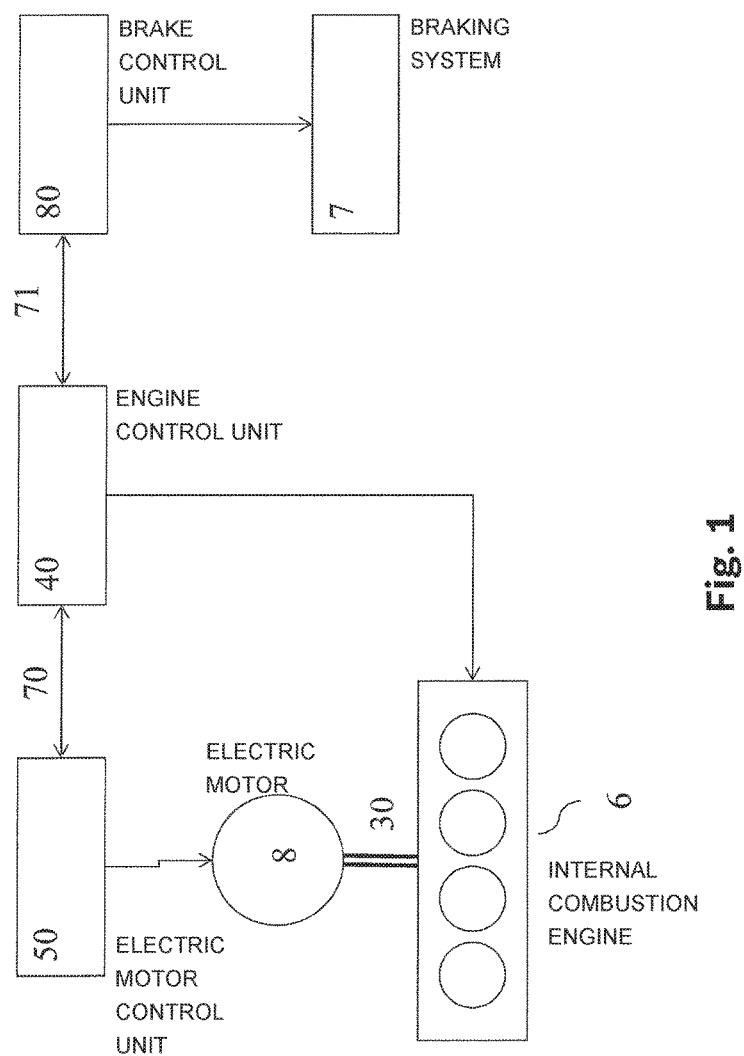
FIG. 1 schematically depicts a drive train of the motor vehicle.

FIG. 1 schematically shows a drive train of a motor vehicle whose drive train encompasses an electrical machine operable in motor mode. In the exemplifying embodiment, this electrical machine operable in motor mode is an electric motor 8, but it could also be, for example, a starter generator.

In the exemplifying embodiment the motor vehicle also encompasses an internal combustion engine 6, but the latter is not obligatorily necessary. In the exemplifying embodiment the motor vehicle furthermore has a manual clutch (not depicted) with which internal combustion engine 6 and electric motor 8 can be disconnected from the rest of the drive train of the motor vehicle, for example in order to enable a gear ratio change of a transmission. In the exemplifying embodiment the electric motor is connected to internal combustion engine 6 via a belt drive 30. This too is not obligatorily necessary.

All that is important for the invention is that the electrical machine operable in motor mode, i.e. electric motor 8 in the exemplifying embodiment, is coupled to wheels of the motor vehicle in such a way that it can drive the vehicle.

In the exemplifying embodiment, electric motor 8 has control applied to it by an electric motor control unit 50, and internal combustion engine 6 has control applied to it by an engine control unit 40. The two control units communicate with one another via a bus system 70. A braking system 7, for example an ESP, has control applied to it via a brake control unit 80 that communicates with engine control unit 40 via a further bus system 71.

Figure 2:
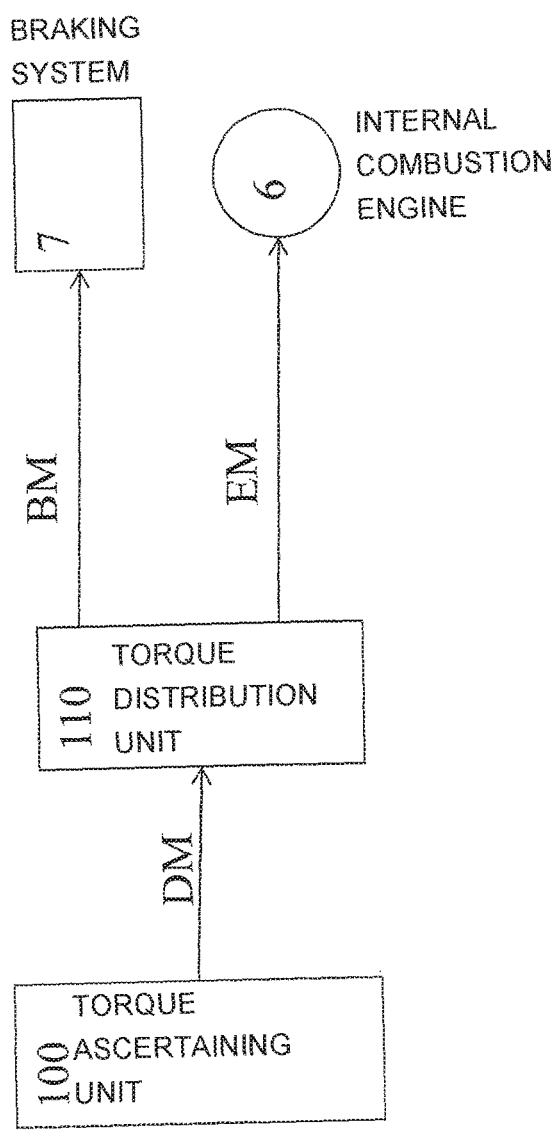
FIG. 2 shows a drive-off controller according to a first aspect of the invention.

FIG. 2 shows a first aspect of an apparatus for controlling a drive-off operation of the motor vehicle. A torque ascertaining unit 100 ascertains a total torque DM that is necessary in the context of the drive-off operation of the vehicle in order to drive the vehicle and to overcome vehicle-internal resistance (for example moments of inertia). A torque distribution unit 110 divides this total torque DM into a braking torque BM that is established by braking system 7, and a driving torque EM that is established by electric motor 8.

The sum of the driving torque EM and the (negative) braking torque BM may be equal to the total torque DM; more particularly, the driving torque EM is greater than the total torque by an amount equivalent to an offset, so that the braking torque BM is greater than zero.

If the total torque DM required then rises abruptly, this request can be responded to not only by an elevation of the driving torque EM but also, alternatively or additionally, by a reduction in the braking torque BM.

Figure 3:
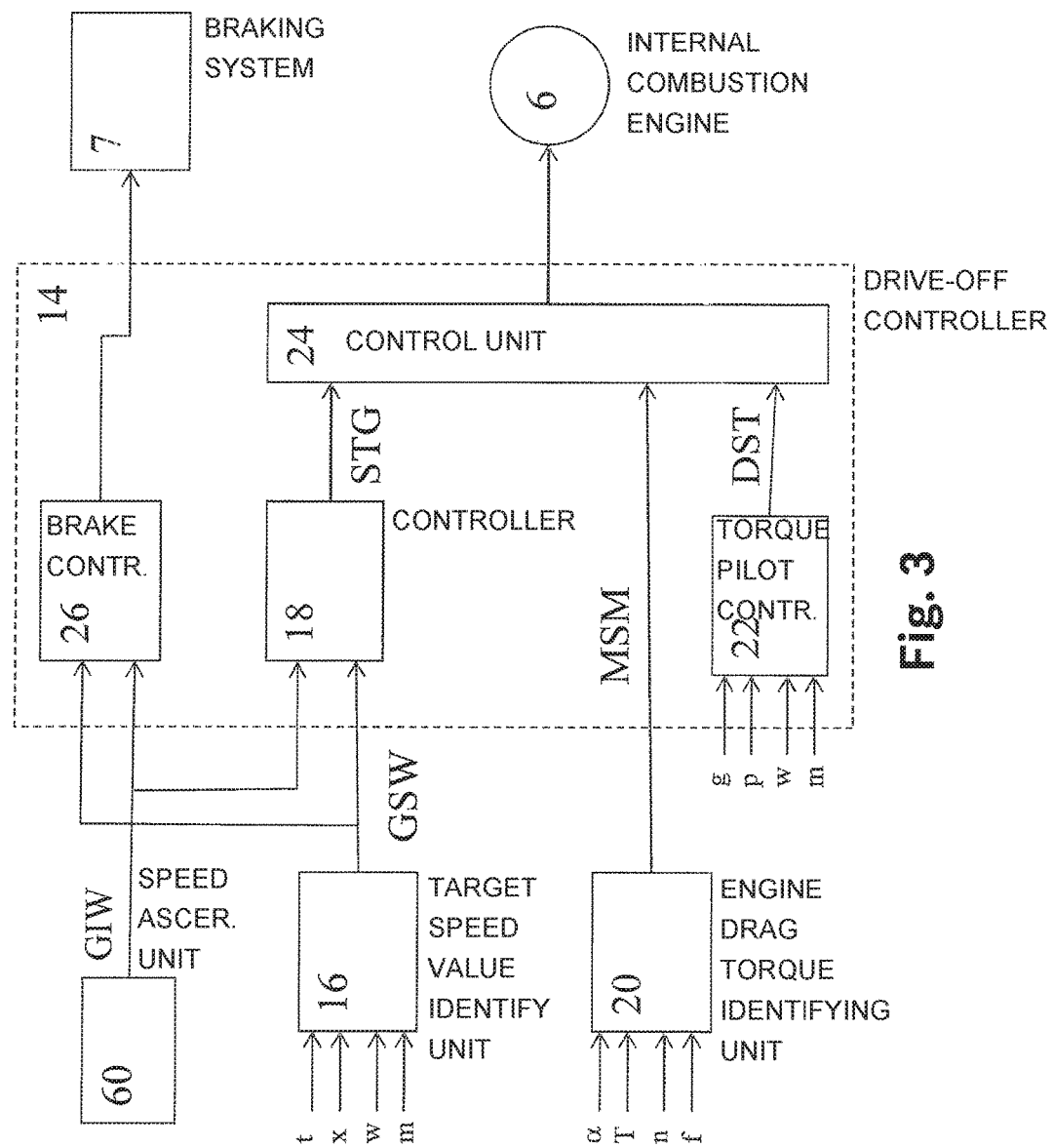
FIG. 3 shows a drive-off controller according to a second aspect of the invention.

FIG. 3 schematically shows a further aspect of an apparatus for driving off. FIG. 3 shows a drive-off controller 14 for a drive-off operation of the motor vehicle, and optionally for starting internal combustion engine 6 by way of electric motor 8 when the drive train is closed. Drive-off controller 14 may be implemented in program-engineering fashion in engine control unit 40.

In the present exemplifying embodiment drive-off controller 14 has a controller 18, a brake engagement controller 26, an engine drag torque identifying unit 20, and a torque pilot control unit 22. The drive-off controller receives a target speed value GSW from a target speed value identifying unit 16. Controller 18 serves substantially to define the torque delivered by electric motor 8 in such a way that the desired speed, i.e. the target speed value GSW, is reached. Engine drag torque identifying unit 20 substantially serves, together with torque pilot control unit 22, to vary the torque delivered by electric motor 8 in such a way that it counteracts (ideally compensates to zero) crankshaft angle-dependent fluctuations of a drag torque of internal combustion engine 6.

Drive-off controller 14 furthermore has a control unit 24 for applying control to electric motor 8.

In the present exemplifying embodiment, target speed value identifying unit 16 is embodied or configured to read in as input variables a time t, a road slope angle w, a vehicle weight m, and a gas actuation element position x, in particular of the gas pedal. From these input variables, target speed value identifying unit 16 identifies the target speed value GSW. Target speed value identifying unit 16 may be configured to identify the target speed value GSW in such a way that the drive-off operation proceeds pleasantly for occupants, i.e. an appropriate vehicle acceleration is achieved. The intention is in particular to prevent the drive train from transferring excessive torques or insufficient torques. Excessive torques cause excessive acceleration, which is experienced as unpleasant by occupants (except when so desired by the driver (kickdown or too much gas)); insufficient torques can promote vibration while driving off, since the drive train and possibly the engine block are operated for a longer time in the inherent resonance band.

The target speed value GSW is an input variable of controller 18, which in the present exemplifying embodiment has a PID controller. An actual speed value GIW of the motor vehicle, ascertained by a speed ascertaining unit 60, is conveyed to controller 18 as a further input variable. Controller 18 supplies as output a control variable STG that is conveyed to control unit 24. Let it be emphasized that in the exemplifying embodiment, the target speed value identifying unit and the controller are depicted merely by way of example, and represent simply advantageous but not obligatory features of the invention.

In the present exemplifying embodiment, engine drag torque identifying unit 20 is embodied or configured to read in a crankshaft angle α, an internal combustion engine temperature T, an internal combustion engine rotation speed n, and a cylinder filling ratio f as input variables. From these input variables, engine drag torque identifying unit 20 identifies, in particular using characteristics diagrams, an engine drag torque MSM that is conveyed to control unit 24. Let it be emphasized that except for the crankshaft angle α, all other input variables are optional.

In the present exemplifying embodiment, torque pilot control unit 22 is embodied or configured to read in an engaged gear ratio g of transmission 12, an internal combustion engine starting position p, i.e. an initial crankshaft angle, the road slope angle w, and the vehicle weight m as input variables. From these input variables, torque pilot control unit 22 identifies a torque control variable DST that is conveyed to control unit 24. Torque pilot control unit 22 serves substantially to take into account (i.e. to counteract or ideally to compensate to zero) variables that act in crankshaft angle-independent fashion on the torque to be delivered, in particular the drive-off resistance, rolling resistance, slope drag. Let it be emphasized that in the exemplifying embodiment, the torque pilot control unit is depicted merely by way of example and does not represent an obligatory feature of the invention.

Control unit 24 is embodied or configured to evaluate the control variable STG, engine drag torque MSM, and torque control variable DST, and to apply control to electric motor 8 in such a way that the engine drag torque is maximally compensated for, and a drive-off operation and the starting of internal combustion engine 6 are carried out more smoothly, i.e. substantially without jerking. "Without jerking" is understood here as an acceleration that is felt by occupants of the motor vehicle to be smooth and fluctuation-free. In particular, the acceleration is perceived as continuous over a longer time period of, for example, several seconds.

Provision can be made that electric motor 8 has control applied to it with an elevated torque, for example by increasing the torque control variable DST ascertained by torque pilot control unit 22 by an amount equivalent to an offset.

In the exemplifying embodiment, the actual speed value GIW and target speed value GSW are also conveyed to brake engagement controller 26. Brake engagement controller 26 ascertains whether the actual speed values GIW exceeds the target speed value GIW, and in that case applies control to braking system 7 in such a way that the vehicle is decelerated.

Drive-off controller 14, target speed value identifying unit 16, controller 18, engine drag torque identifying unit 20, torque pilot control unit 22, control unit 24, and brake engagement controller 26 can encompass hardware components and/or software components.

What is claimed is:

1. A method for operating a motor vehicle, the method comprising:
   controlling, in a drive-off operation, an electrical machine operable in a motor mode, to deliver a torque driving the vehicle; and
   controlling simultaneously a braking system of the motor vehicle so that it applies a braking torque;
   wherein control of the braking system occurs as a function of an actual speed value of the motor vehicle and as a function of a target speed value of the motor vehicle,
   wherein control is applied in a braking manner to the braking system if the actual speed value is greater than the target speed value, and
   wherein the torque delivered by the electrical machine, which is operable in a motor mode, contains a component dependent on an angle of a crankshaft of an internal combustion engine of the motor vehicle which counteracts variables that act in a crankshaft angle-independent manner on the torque to be delivered.

2. The method of claim 1, wherein if there is an increase in a requested total torque, the braking torque is decreased, which is faster than increasing the driving torque of the electrical machine operable in a motor mode.

3. A method for operating a motor vehicle, the method comprising:
   controlling, in a drive-off operation, an electrical machine operable in a motor mode, to deliver a torque driving the vehicle; and
   controlling simultaneously a braking system of the motor vehicle so that it applies a braking torque;
   wherein control of the braking system occurs as a function of an actual speed value of the motor vehicle and as a function of a target speed value of the motor vehicle,
   wherein control is applied in a braking manner to the braking system if the actual speed value is greater than the target speed value, and
   wherein control is applied to the electrical machine, which is operable in a motor mode, to deliver a torque, so that the torque delivered by it contains a component dependent on an angle of a crankshaft of an internal combustion engine which counteracts crankshaft angle-dependent fluctuations of a drag torque of the internal combustion engine.

4. The method of claim 3, wherein the identification of the crankshaft angle-dependent component is accomplished by a torque pilot control.

5. A non-transitory machine-readable memory medium having a computer program, which is executable by a calculation unit, comprising:
   a program code arrangement having program code for operating a motor vehicle, by performing the following:
      control, in a drive-off operation, an electrical machine operable in a motor mode, to deliver a torque driving the vehicle; and
      controlling simultaneously a braking system of the motor vehicle so that it applies a braking torque;
      wherein application of control to the braking system occurs as a function of an actual speed value of the motor vehicle and as a function of a target speed value of the motor vehicle, and
   wherein control is applied in a braking manner to the braking system if the actual speed value is greater than the target speed value, and
   wherein the torque delivered by the electrical machine, which is operable in a motor mode, contains a component dependent on an angle of a crankshaft of an internal combustion engine of the motor vehicle which counteracts variables that act in a crankshaft angle-independent manner on the torque to be delivered.

6. The machine-readable memory medium of claim 5, wherein if there is an increase in a requested total torque, the braking torque is decreased, which is faster than increasing the driving torque of the electrical machine operable in a motor mode.

* * * * *